United States Patent
Flick et al.

(10) Patent No.: US 8,313,039 B2
(45) Date of Patent: *Nov. 20, 2012

(54) REMOTE CLIMATE CONTROL SYSTEM PROVIDING AN INDICATION RELATING TO REMOTE CLIMATE CONTROL OPERATION AND ASSOCIATED METHODS

(75) Inventors: Kenneth E. Flick, Douglasville, GA (US); Michael Stephen Thompson, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 641 days.

This patent is subject to a terminal disclaimer.

(21) Appl. No.: 12/571,050

(22) Filed: Sep. 30, 2009

(65) Prior Publication Data

US 2011/0073667 A1    Mar. 31, 2011

(51) Int. Cl.
*G05D 23/00* (2006.01)
*B60H 1/32* (2006.01)
*B60G 17/018* (2006.01)

(52) U.S. Cl. ............... 236/51; 62/244; 701/36

(58) Field of Classification Search ........... 62/126, 62/244; 236/51; 165/42; 701/36; 123/179.2, 123/179.3
See application file for complete search history.

(56) References Cited

U.S. PATENT DOCUMENTS

| | | | |
|---|---|---|---|
| 5,719,551 A | 2/1998 | Flick | 340/426 |
| 6,011,460 A | 1/2000 | Flick | 340/426 |
| 6,346,876 B1 | 2/2002 | Flick | 340/426 |
| 6,529,124 B2 | 3/2003 | Flick | 340/426 |
| 6,756,885 B1 | 6/2004 | Flick | 340/426.1 |
| 6,756,886 B2 | 6/2004 | Flick | 340/426.1 |
| 6,812,829 B1 | 11/2004 | Flick | 340/426.13 |
| 6,828,901 B2 | 12/2004 | Birchfield et al. | 340/10 |
| 7,010,402 B2 | 3/2006 | Flick | 701/36 |
| 7,031,826 B2 | 4/2006 | Flick | 701/113 |
| 7,046,126 B2 | 5/2006 | Flick | 340/426.36 |
| 7,068,153 B2 | 6/2006 | Flick | 340/426.36 |
| 7,091,822 B2 | 8/2006 | Flick et al. | 340/5.72 |

(Continued)

OTHER PUBLICATIONS

Excalibur 1800 ATV Gold Series Owners Manual, Omega Research & Development Inc., 1998, pp. 3-50.

(Continued)

*Primary Examiner* — Chen Wen Jiang
(74) *Attorney, Agent, or Firm* — Allen, Dyer, Doppelt, Milbrath & Gilchrist, P.A.

(57) ABSTRACT

A remote climate control system for a vehicle includes a remote climate controller to be positioned at a vehicle for starting an electrically powered climate control system based upon a remote climate control handheld unit and causing the electrically powered climate control system to run for a run time period before shutting it off. The remote climate controller is resettable based upon the remote climate control handheld unit to cause the electrically powered climate control system to run for an additional run time period before shutting it off. The remote climate control handheld unit has an indicator for providing an indication to a user prior to expiration of the run time period to permit a user to reset the run time period while the electrically powered climate control system is still running and before shutting off the electrically powered climate control system.

25 Claims, 12 Drawing Sheets

U.S. PATENT DOCUMENTS

| | | | |
|---|---|---|---|
| 7,205,679 B2 | 4/2007 | Flick | 307/10.3 |
| 7,224,083 B2 | 5/2007 | Flick | 307/10.6 |
| 7,280,908 B2 | 10/2007 | Maehara et al. | |
| 7,369,936 B2 | 5/2008 | Flick | 701/113 |
| 7,378,945 B2 | 5/2008 | Flick | 340/426.1 |
| 2006/0080007 A1* | 4/2006 | Gerard et al. | 701/2 |
| 2006/0087405 A1 | 4/2006 | Koike et al. | |
| 2008/0203815 A1 | 8/2008 | Ozawa et al. | |
| 2011/0073059 A1* | 3/2011 | Flick | 123/179.2 |

OTHER PUBLICATIONS

Excalibur AL-2000-EDP, Operation Manual, Omega Research & Development Inc., Mar. 2007, pp. 1-43.

* cited by examiner

REMOTE CLIMATE CONTROL SYSTEM PROVIDING AN INDICATION RELATING TO REMOTE CLIMATE CONTROL OPERATION AND ASSOCIATED METHODS

FIELD OF THE INVENTION

The present invention relates to the field of remote vehicle control, and, more particularly, to a remote vehicle control system such as to start an engine and related methods.

BACKGROUND OF THE INVENTION

The passenger compartment of a vehicle parked outside during a cold day may become very cold, with temperatures reaching that of the ambient air outside the vehicle. Likewise, the passenger compartment of a vehicle parked outside during a hot day may become very hot, very quickly, with temperatures that greatly exceed that of the ambient air outside the vehicle.

Some drivers start a vehicle, activate the vehicle's climate control system, then leave the vehicle until the climate control system begins to heat or cool the vehicle. However, this requires the driver to leave the comfort of the indoors, momentarily enter the vehicle, start the engine and operate the climate control system, and leave the vehicle unattended with the engine running.

To avoid this, remote starting systems have been developed which allow a driver to start a vehicle's engine without entering the vehicle. Typical remote starting systems, such as that disclosed in U.S. Pat. No. 6,828,901 to Birchfield et al., include a remote start controller positioned at a vehicle that causes an engine starter to start an engine based upon a remote start handheld unit, such as a key fob.

More advanced remote starting systems, such as the Excalibur AL-2000-EDP, produced and sold by Omega Research & Development (Douglasville, Ga.) have been developed. The user's manual to this system explains that its remote start controller, after having remotely started a vehicle's engine, shuts the engine off after a run time period. By limiting the duration the engine may run when remotely started, the drawbacks of less advanced remote starting systems are alleviated.

Systems such as the Excalibur AL-2000-EDP provide the user with a visual indication of the remaining run time period, and that the run time period has expired and that the engine is shut off, thereby allowing the user to once again remotely start the engine for another run time period if desired.

SUMMARY OF THE INVENTION

In view of the foregoing background, it is therefore an object of the present invention to provide a remote climate control system for a vehicle with greater convenience.

This and other objects, features, and advantages in accordance with the present invention are provided by a remote climate control system for a vehicle comprising an electrical power source and an electrically powered climate control system selectively powered thereby that provides an indication for a user before the engine has been shut off. The remote climate control system may comprise a remote climate control handheld unit comprising a housing and a processor carried thereby. A remote climate controller may be positioned at the vehicle for starting the electrically powered climate control system based upon the remote climate control handheld unit to cause causing the electrically powered climate control system to run for a run time period before shutting off the electrically powered climate control system.

The remote climate controller may also be resettable based upon the remote climate control handheld unit to cause the electrically powered climate control system to run for an additional run time period while the electrically powered climate control system is still running and before shutting off the electrically powered climate control system. The remote climate control handheld unit may also include an indicator cooperating with the processor for providing an indication to a user prior to expiration of the run time period. This permits a user to use the remote climate control handheld unit to reset the run time period while the electrically powered climate control system is still running and before shutting off the electrically powered climate control system.

This remote starting system provides additional convenience and addresses various drawbacks of the prior art. Having to restart the engine when the user desires the engine to run for another run time period, as per the prior art, may not be desirable for a variety of reasons. A significant percentage of engine wear occurs at startup, and this remote starting system helps reduce engine wear due to unnecessary starting and restarting. Moreover, the remote starting system may help to reduce the amount of pollutants produced by the engine since it will not be started, stopped, then restarted unnecessarily.

During this starting, stopping, and restarting of the engine as per the prior art, a vehicle's climate control system may immediately cease to function when the engine is shut off, thereby allowing the passenger compartment of the vehicle to heat up or cool down contrary to the user's desire. The remote starting system of the present invention addresses this drawback as well.

The vehicle may further comprise a sensor associated with the electrical power source and the remote climate controller may also be for starting the electrically powered climate control system based upon the sensor. The indicator may also comprise a tactile indicator and the indication may comprise a tactile indication. Additionally or alternatively, the indicator may comprise an audible indicator and the indication may comprise an audible indication. The indicator may also comprise a visible indicator and the indication may comprise a visible indication.

The processor may implement a timing function to operate the indicator. Additionally or alternatively, the remote climate controller may implement a timing function to send an alert to the remote climate control handheld unit prior to expiration of the run time period and the processor of the remote climate control handheld unit may provide the indication based upon the alert. In addition, the remote climate controller may have a settable run time period.

The vehicle may have a data communications bus extending throughout the vehicle and the remote climate controller may cause a climate control start signal to be generated on the data communications bus for starting the electrically powered climate control system. Additionally, the remote climate controller may cause a climate control stop signal to be generated on the data communications bus for shutting off the electrically powered climate control system.

The electrically powered system may comprise at least one of an electrically powered air conditioning (AC) compressor, an electrical heater, and an electrical ventilation blower. The remote climate control handheld unit may comprise a cellular telephone. The remote climate controller may be a multi-vehicle compatible remote climate controller.

A method aspect is directed to a method of using a remote climate control system for a vehicle comprising an electrical power source and an electrically powered climate control system selectively powered thereby. The method may include starting the electrically powered climate control system, with a remote climate controller positioned at the vehicle, based upon a remote climate control handheld unit and the electrically powered climate control system, and causing the electrically powered climate control system to run for a run time period before shutting off the electrically powered climate control system. The method may further include generating an indication, using an indicator, to a user prior to expiration of the run time period to permit a user to use the remote climate control handheld unit to reset the run time period to cause the electrically powered climate control system to run for an additional run time period, while the electrically powered climate control system is still running and before shutting off the electrically powered climate control system.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Figure 1:
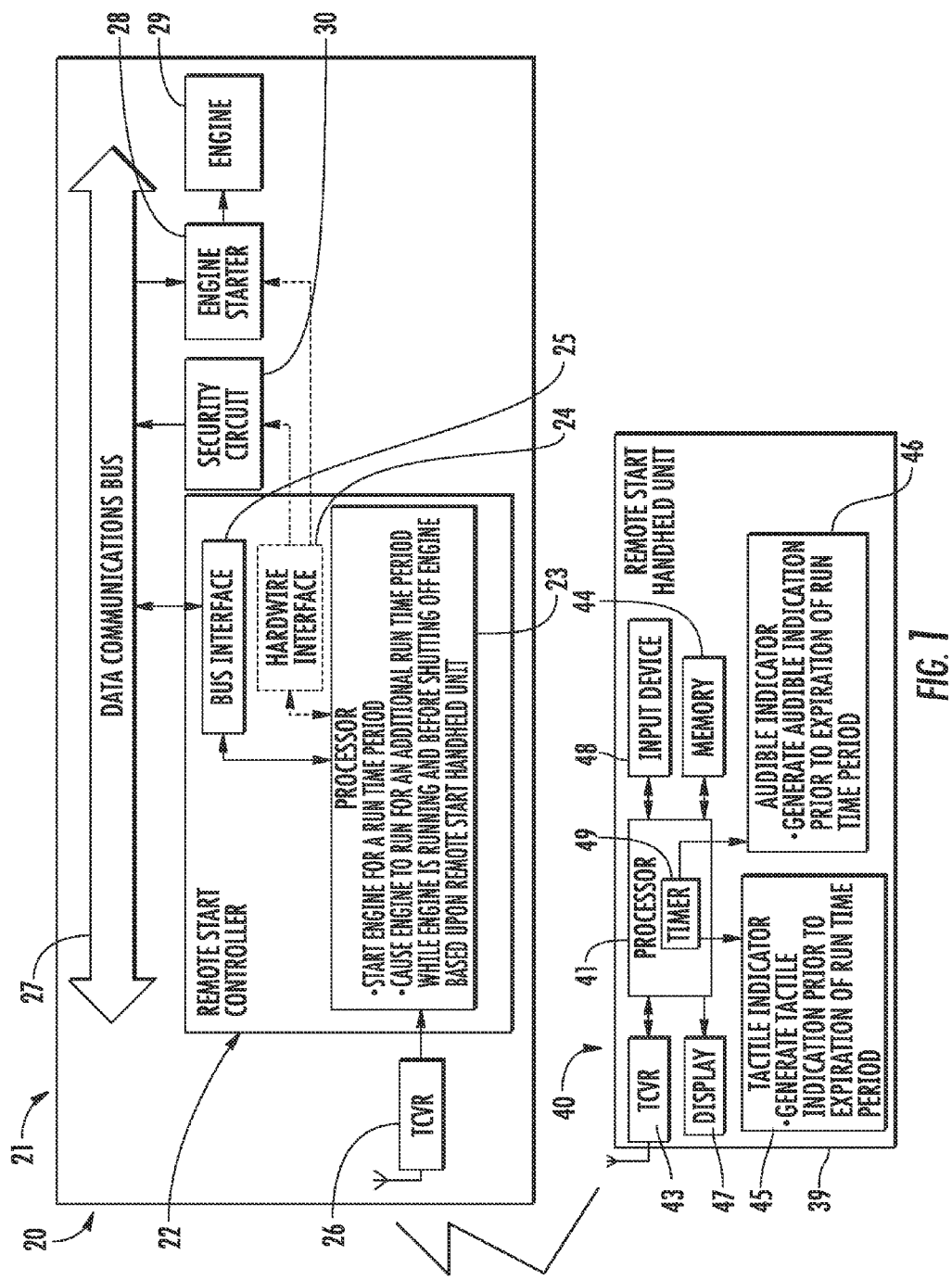
FIG. 1 is a schematic block diagram of a remote starting system for an engine of a vehicle in accordance with the present invention.

Referring initially to FIG. 1, a remote starting system 20 for an engine 29 of a vehicle 21 is now described. The engine 29 may be an internal combustion engine that burns gasoline, diesel, ethanol, or other fuels, for example. The vehicle 21 also includes an engine starter 28 for starting the engine 29. In addition, the vehicle 21 includes a security circuit 30 connected to the engine starter 28 to selectively disable the operation thereof and therefore the operation of the engine 29. Indeed, in some applications, the security circuit 30 may selectively disable operation of a plurality of, or all of, the devices and functions of the vehicle 21.

The vehicle 21 has a data communications bus 27 extending throughout. The data communications bus 27 may extend through the engine compartment, the passenger compartment, and/or the trunk of the vehicle 27. The security circuit 30 and the engine starter 28 are each coupled to the data communications bus 27 for communication thereover. Those of skill in the art will understand that the security circuit 30 and/or the engine starter 28 need not be on the data communications bus 27. Indeed, one of, or both of the security circuit 30 and the engine starter 29 may be on the data communications bus 27. Furthermore, each of the security circuit 30 and the engine starter 29 may communicate unidirectionally via the data communications bus 27, or may communicate bidirectionally via the data bus. Each of the security circuit 30 and the engine starter 29 need not communicate in the same manner via the data communications bus 27. For example, the security circuit 30 may communicate bidirectionally while the engine starter 28 communicates unidirectionally.

It should be understood that there may be intervening circuitry, such as a body control module, engine control module, or powertrain control module, for example, between the data communications bus 27, the security circuit 30, and/or the engine starter 29.

The remote starting system 20 illustratively includes a remote start handheld unit 40 comprising a housing 29. The housing carries a processor 41 coupled to a transceiver 43, a memory 44, a vibration unit 45, a speaker 46, a display 47, and an input device 48. Further details of the functions of these components will be given below.

The remote starting system 20 also includes a transceiver 26 to be positioned at the vehicle 21. In addition, the remote starting system 20 includes a remote start controller 22 to be positioned at the vehicle 21 for starting the engine 29 based upon the remote start handheld unit 40, thereby causing the engine to run for a run time period before shutting off the engine 29. To start the engine 29, the remote start controller 40 causes an engine start signal to be generated on the data communications bus 27 for operating the engine starter 28, which then starts the engine. It should be understood that the remote start controller 22 itself may not generate the engine start signal on the data communications bus 27, but instead may cause an intervening component to generate the engine start signal on the data communications bus. Of course, in some applications, the remote start controller 22 may instead be coupled to the engine starter 28 via the hardwire interface 24, and may operate the engine starter to start the engine 29 via the hardwire interface instead of via the data bus.

The communications from the remote start handheld unit 40 to the transceiver 26 at the vehicle 21 is typically a direct radio frequency link. In other words, there are no intervening communications links. However, in other embodiments, the remote start handheld unit 40 may indirectly communicate with the transceiver 26 via other communications infrastructure, such a satellite, the public switched telephone network (PSTN), and/or over the World Wide Web or Internet, as will be appreciated by those skilled in the art.

The remote start handheld unit 40 may be a common remote transmitter. By common remote transmitter, it is meant that the remote start handheld unit 40 may operate a plurality of vehicles 21. Such a feature may be desirable to a driver who owns multiple vehicles 21 or to a rental car company, for example.

The remote start controller 22 may be a multi-vehicle compatible remote start controller that cooperates with the transceiver 26. Those of skill in the art will understand that the transceiver 26 and the remote start controller 22 may be associated together in a same housing. In fact the transceiver 26 and the remote start controller 22 may each be embodied on a same printed circuit board or even in a same integrated circuit. The remote start controller 22 illustratively bypasses the security circuit 30 to enable operation of the engine starter 28 to thereby start the engine 29.

The remote start controller 22 is coupled to the data communications bus 27 extending within the vehicle 21, via the bus interface 25, for communication thereover with the security circuit 30 and engine starter 28. Those skilled in the art will appreciate that there may be intervening components between the bus interface 25 and the data communications bus 27, such as a body control module, engine control module, or powertrain control module. Of course, in some embodiments, the remote start controller 22 may communicate with the security circuit 30 and/or engine starter 28 via a hardwired connection at the hardwire interface 24. In some embodiments, the vehicle 21 may not have a data bus 27.

The run time period is resettable based upon the remote start handheld unit 40 to cause the engine 29 to run for an additional run time period, or other time period, while the engine is still running and before shutting off the engine. That is, the transceiver 43 of the remote start handheld unit 40 may be operated by a user to transmit a signal to the remote start controller 22 instructing it to reset or extend the run time period. This advantageously allows a user to keep the engine 29 running for a greater period of time than the run time period without the engine being stopped.

If the run time period expires before being reset, the remote start controller 22 stops the engine. To stop the engine, the remote start controller 22 may cause an engine stop signal to be generated on the data communications bus 27. It should be understood that the remote start controller 22 itself may not generate the engine stop signal on the data communications bus 27, but instead may cause an intervening component to generate the engine stop signal on the data communications bus. Of course, in hardwired embodiments, the engine may also be shut down.

The vibration unit 45 of the remote start handheld unit 40 cooperates with the processor 41 for providing a tactile indication to a user prior to expiration of the run time period. Additionally or alternatively, the speaker 46 may provide an audible indication to the user prior to the expiration of the run time period. This permits the user to use the remote start handheld unit 40 to reset the run time period while the engine is still running and before shutting off the engine, for example by entering a command into the input device 48.

The display 47 of the remote start handheld unit 40 may cooperate with the processor 41 for providing a visual indication to the user prior to expiration of the run time period. The visual indication may be a countdown until the expiration of the rune time period, for example.

The processor 41 of the remote start handheld unit 39 includes a timer 49 executing a timing function to operate the vibration unit 45, and/or the speaker 46. The pattern of vibrations may be settable based upon input received via the input device 48. Of course, the speech message or pattern of tones may also be settable based upon input receives via the input device 48.

Figure 2:
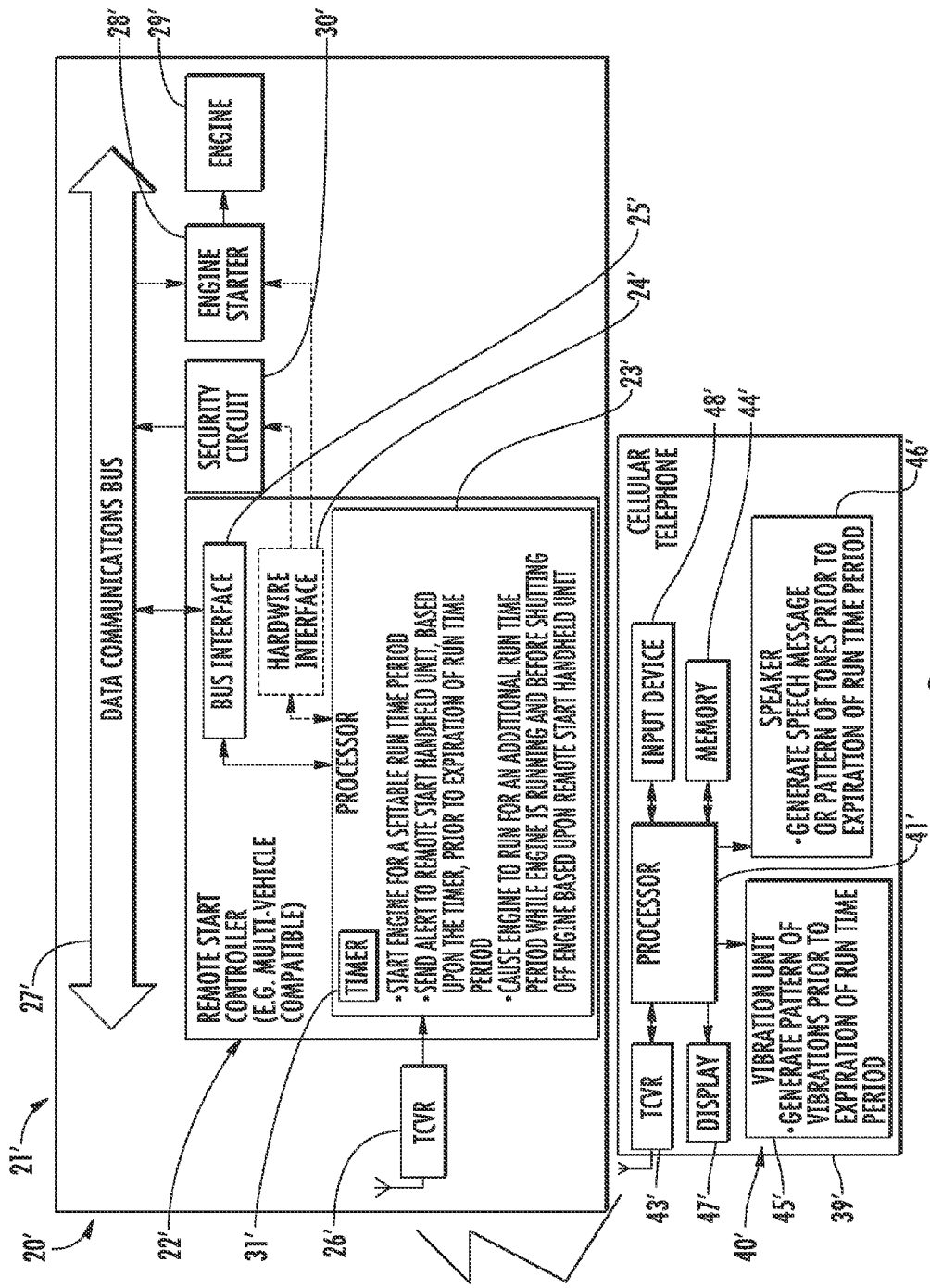
FIG. 2 is a schematic block diagram of a further embodiment of a remote starting system for an engine of a vehicle in accordance with the present invention.

With reference to FIG. 2, an alternative embodiment of the remote start controller 22' is now described. In this embodiment, the remote start handheld unit 40' comprises a cellular telephone. In addition, the run time period is settable, for example based upon the cellular telephone 40'. The run time period may also be settable based upon a switch (not shown) connected to the remote start controller 22', or based upon a signal received over the data communications bus 27' from another component.

In addition, in this embodiment, the remote start controller 22' is multi-vehicle compatible. By multi-vehicle compatible, it is meant that the remote start controller 22' may be able to communicate with other devices on the data bus 27' using a desired set of codes from among a plurality of different sets of codes for different vehicles or vehicle platforms.

In other words, the same remote start controller 22' may be installed in a variety of different vehicles. More details of multi-vehicle compatible devices and operation may be found in the following references, each of which is incorporated by reference herein in its entirety, and assigned to the assignee of the present invention. U.S. Pat. Nos. 7,378,945; 7,369,936; 7,224,083; 7,205,679; 7,091,822; 7,068,153; 7,046,126; 7,031,826; 7,010,402; 6,812,829; 6,756,886; 6,756,885; 6,529,124; 6,346,876; 6,011,460; and 5,719,551.

In some embodiments, the remote start controller 22' implements a timing function executed by a timer 31' of the processor 23' to send an alert to the remote handheld unit 22' in the form of a cellular telephone prior to expiration of the run time period. The processor 41' of the cellular telephone provides the tactile or audible indication based upon the alert. In this embodiment, the tactile indication is a pattern of vibrations, and the audible indication is a speech message or pattern of tones. In some embodiments, the remote start handheld unit 40' may include a microphone (not shown) for recording the speech message, and a plurality of songs and/or speech messages may be stored in the memory 44', each to be used as a pattern of tones.

Other components of the remote starting system 20' are similar to those described above with reference to FIG. 1. Those components therefore need no further discussion herein.

Figure 3:
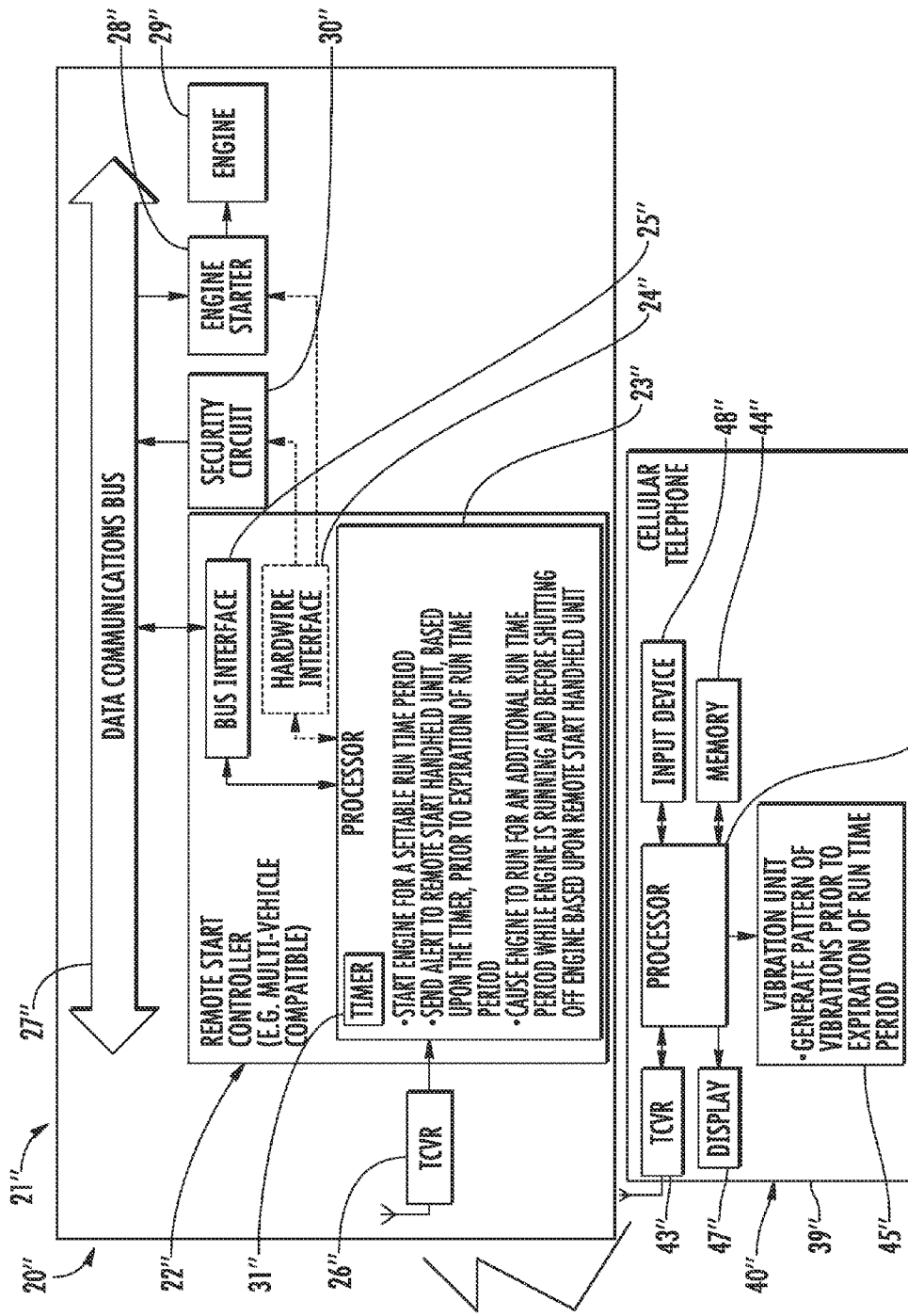
FIG. 3 is a schematic block diagram of yet another embodiment of a remote starting system for an engine of a vehicle in accordance with the present invention.
Figure 4:
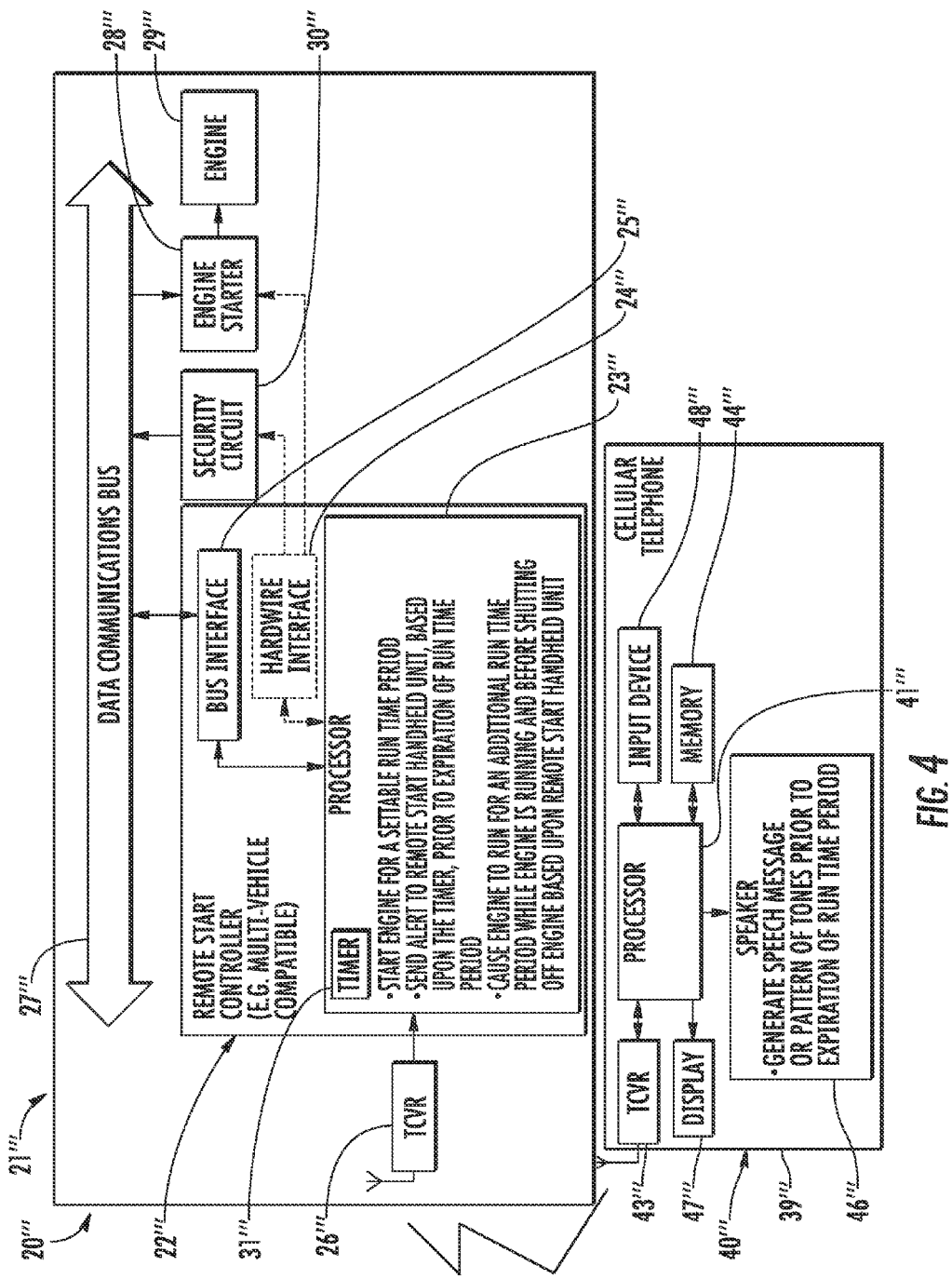
FIG. 4 is a schematic block diagram of still another embodiment of a remote starting system for an engine of a vehicle in accordance with the present invention.

In some embodiments, the remote starting system 20" (FIG. 3) may provide only a tactile indication through the vibration unit 45", and may not have a speaker. In other embodiments, the remote starting system 20''' (FIG. 4), many only provide an audible indication through the speaker 46''', and may not have a vibration unit. Other components of the remote starting systems 20", 20''' are similar to those described above with reference to FIG. 2. Those components therefore need no further discussion herein.

Figure 5:
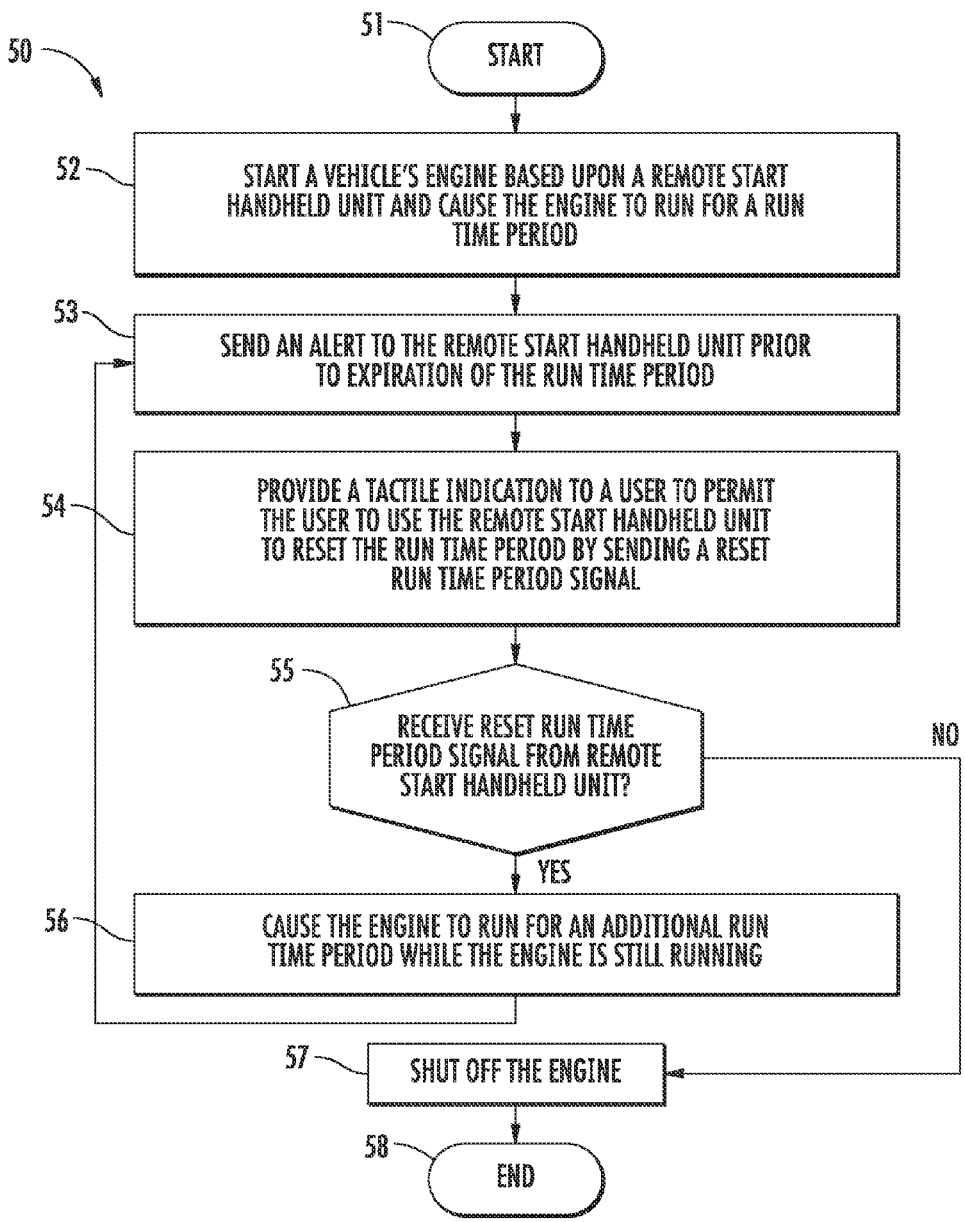
FIG. 5 is a flowchart of a method of operating a remote starting system in accordance with the present invention.

With reference to the flowchart 50 of FIG. 5, a method of operating a remote starting system in a vehicle is described. After the start (Block 51), at Block 52, the vehicle's engine is started based upon a remote start handheld unit and caused to run for a run time period.

At Block 53, an alert is sent to the remote start handheld unit prior to expiration of the run time period. At Block 54, a tactile indication is provided to a user to permit the user to use the remote start handheld unit to reset the run time period by sending a reset run time period signal.

If a reset run time period signal is not received at Block 55, the engine is shut off at Block 57. If a reset run time period signal is received from the remote start handheld unit at Block 55, the engine is caused to run for an additional run time period at Block 56. At this point, an alert is again sent to the remote start handheld unit prior to expiration of the run time period at Block 53 again. The steps repeat until a reset run time period signal is not received from the remote start handheld unit at Block 55. At this point, the engine is shut off at Block 57. Block 58 indicates the end of the method.

Figure 6:
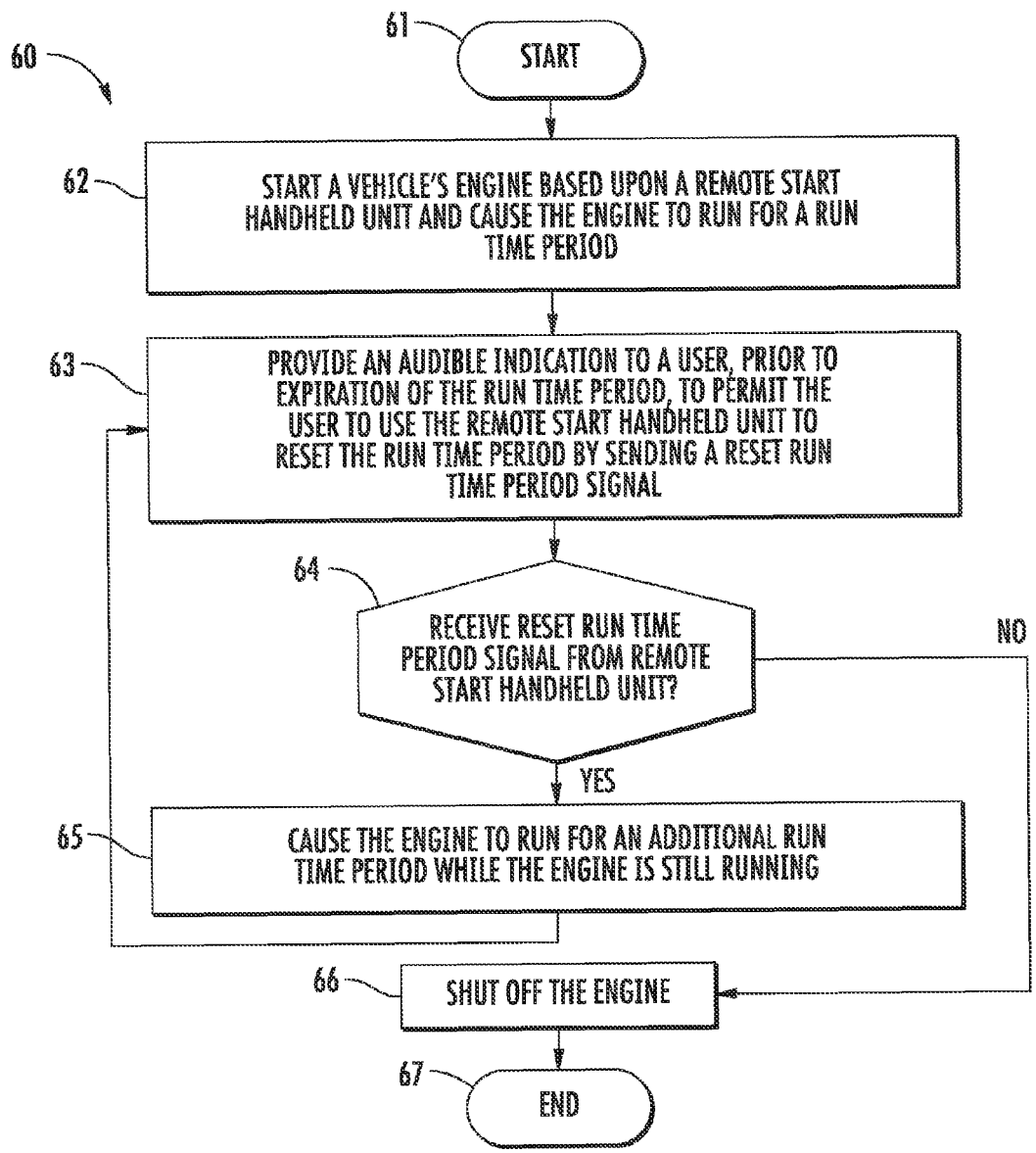
FIG. 6 is a flowchart of another method of operating a remote starting system in accordance with the present invention.

With reference to the flowchart 60 of FIG. 6, another method of operating a remote starting system is now described. After the start (Block 61), at Block 62, the vehicle's engine is started based upon a remote start handheld unit and caused to run for a run time period.

At Block 63, an audible indication is provided to a user, prior to expiration of the rune time period, to permit the user to use the remote start handheld unit to reset the run time period by sending a reset run time period signal.

If a reset run time period signal is not received at Block 64, the engine is shut off at Block 66. If a reset run time period signal is received from the remote start handheld unit at Block 64, the engine is caused to run for an additional run time period at Block 65. At this point, an audible indication is again provided to the user at Block 63. The steps repeat until a reset run time period signal is not received from the remote start handheld unit at Block 64. At this point, the engine is shut off at Block 66. Block 67 indicates the end of the method.

Figure 7:
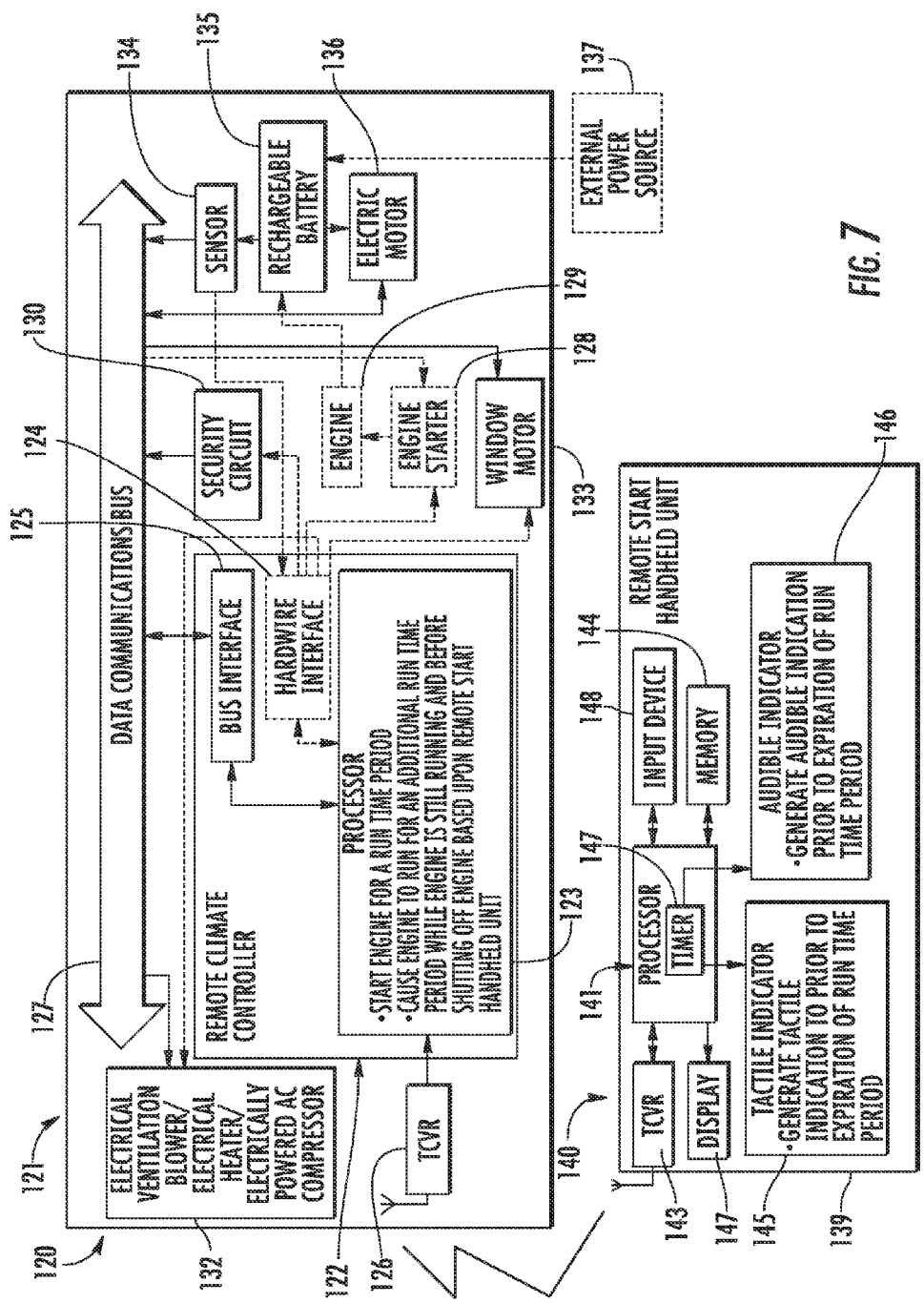
FIG. 7 is a schematic block diagram of a remote climate control system for a vehicle in accordance with the present invention.

Referring now to FIG. 7, another embodiment of a remote climate control system 120 for a vehicle 121 is now described. The vehicle 121 has a rechargeable battery 135, although those of skill in the art will appreciate that the vehicle may have another rechargeable electrical power source. The vehicle 121 has an electric motor 136 electrically powered by the rechargeable battery 135. Skilled artisans will appreciate that there may be more than one electric motor 136 and more than one rechargeable battery 135. In some embodiments, the vehicle 121 is a hybrid vehicle and has an engine 129 that operates a generator or alternator (not shown) to recharge the rechargeable battery 135 and/or power the electric motor 136. An optional separate engine starter 128 starts the engine 129. Those of skill in the art will understand that the engine 129 may instead be started by the electric motor 136.

It should be understood that the engine 129 may be an internal combustion engine that burns gasoline, diesel, ethanol, or other fuels. Rather than an internal combustion engine 129, the vehicle 121 may instead have an external heat engine, such as a Stirling engine.

The vehicle 121 further comprises an electrically powered climate control system 132 selectively powered by the rechargeable battery 135 and a sensor 134 associated with the rechargeable battery. By electrically powered climate control system 135, it is means that the climate control system is not driven by mechanical power from the engine 129 and instead receives electrical power from the rechargeable battery 135 or an alternator/generator (not shown) coupled to the engine 129. Alternatively, the electrically powered climate control system 135 may receive mechanical power from a motor (not shown) coupled to the rechargeable battery 135 or an alternator/generator (not shown) coupled to the engine 129, but not from the engine itself.

The electrically powered climate control system 132 may include an electrical ventilation blower, an electrical heater, and/or an electrically powered AC compressor. A suitable electrical ventilation blower may be a conventional blower coupled to an electric motor via a belt or may be a blower having an internal electric motor. It should be understood that such an electrical ventilation blower merely blows ambient outside air into the passenger compartment of the vehicle 121 and does not actively cool the air, as would an electrically powered AC unit. It may be advantageous to use an electrical ventilation blower to cool the passenger compartment of the vehicle 121 as opposed to an electrical AC unit because the electrical ventilation blower may consume less electricity than an electrical AC unit.

A suitable electrical heater may be a resistive heater or other suitable heater as known to those of skill in the art. In addition, a suitable electrical heater may be a combination heater, for example a heater core with electrical heater coils, which employs both resistive heating and the use of waste heat from the engine 129 to heat the passenger compartment of the vehicle 121.

A suitable electrically powered AC unit may be a conventional AC compressor coupled to an electric motor via a belt or may be an AC compressor having an internal electric motor. In some embodiments, the electrical AC unit may be a thermoelectric cooler or other suitable electric AC unit as known to those of skill in the art.

The vehicle 121 may also include a security circuit 130 connected to the electrically powered climate control system 132. The security circuit 130 selectively disables the electrically powered climate control system 132. Those of skill in the art will appreciate that, in some applications, the security circuit 130 may also be connected to the engine starter 128 to selectively disable the operation thereof and therefore the operation of the engine 129. Indeed, in some applications, the security circuit 130 may selectively disable operation of a plurality of, or all of, the devices and functions of the hybrid vehicle 121.

The vehicle 121 has a data communications bus 127 extending throughout. The data communications bus 127 may extend through the engine compartment, the passenger compartment, and/or the trunk of the vehicle 121.

The sensor 134 is coupled to the rechargeable battery 135 and reads the voltage thereof. The sensor 134 may, additionally or alternatively, be able to detect whether the rechargeable battery is connected to an external power source 137. The external power source 137 may be an electrical socket or recharging station, for example.

The electrically powered climate control system 132, the sensor 134, the security circuit 130, and the engine starter 128 are each coupled to the data communications bus 127 for communication thereover. Those of skill in the art will understand that each of the electrically powered climate control system 132, the sensor 134, the security circuit 130, and the engine starter 128 need not be on the data communications bus 127. Indeed, one of, or a plurality of electrically powered climate control system 132, the sensor 134, the security circuit 130, and the engine starter 128 may be on the data communications bus 127. Furthermore, each of the electrically powered climate control system 132, the sensor 134, the security circuit 130, and the engine starter 128 may communicate unidirectionally via the data communications bus 127, or may communicate bidirectionally via the data bus. In addition, each of the electrically powered climate control system 132, the sensor 134, the security circuit 130, and the engine starter 128 need not communicate in the same manner via the data communications bus 127. For example, the electrically powered climate control system 132 may communicate bidirectionally while the sensor 134 communicates unidirectionally.

It should be understood that there may be intervening circuitry, such as a body control module, engine control module, or powertrain control module, between the electrically powered climate control system 132, the sensor 134, the security circuit 130, and/or the engine starter 128.

The remote climate control system 120 includes a remote start handheld unit 140 comprising a housing 129. The housing carries a processor 141 coupled to a transceiver 143, a memory 144, a vibration unit 145, a speaker 146, a display 147, and an input device 148. Further details of the functions of these components will be given below.

The remote climate control system 120 includes a transceiver 126 to be positioned at the vehicle 121. In addition, the remote climate control system 120 includes a remote climate controller 122 to be positioned at the vehicle 121 for starting the electrically powered climate control system 132 based upon the remote climate control handheld unit 140, thereby causing the electrically powered climate control system 132 to run for a run time period before shutting off the electrically powered climate control system 132.

The remote climate control handheld unit 140 may cause the remote climate controller 122 to heat the passenger compartment of the vehicle 121 to a pre-set temperature. Alternatively, the remote climate control handheld unit 140 may have buttons that enable a user to set the temperature to which the remote climate controller 122 is to heat the passenger compartment of the vehicle 121. Additionally or alternatively, the remote climate control handheld unit 140 may have buttons (input device 148) that enable a user to select to which of a plurality of pre-set temperatures the remote climate controller 122 is to heat the passenger compartment of the vehicle 121.

To start the electrically powered climate control system 132, the remote climate controller 140 causes a climate control start signal to be generated on the data communications bus 127 for operating the electrically powered climate control system 132. It should be understood that the remote climate controller 122 itself may not generate the climate control start signal on the data communications bus 127, but instead may cause an intervening component to generate the climate control start signal on the data communications bus.

The communications from the remote climate control handheld unit 140 to the transceiver 126 at the vehicle 121 are typically a direct radio frequency link. In other words, there are no intervening communications links. However, in other embodiments, the remote climate control handheld unit 140 may indirectly communicate with the transceiver 126 via other communications infrastructure, such a satellite, the public switched telephone network (PSTN), and/or over the World Wide Web or Internet, as will be appreciated by those skilled in the art.

The remote climate control handheld unit 140 may also include one or more central station transmitters, such as may be provided by a satellite transmitter, for example. Such a central station transmitter may also be connected to other communications infrastructures. The remote climate control handheld unit 140 may be a common remote transmitter. By common remote transmitter, it is meant that the remote climate control handheld unit 140 may operate a plurality of vehicles 121. Such a feature may be desirable to a driver who owns multiple vehicles 121 or to a rental car company, for example.

The remote climate controller 122 may be a multi-vehicle compatible remote climate controller that cooperates with the transceiver 126. Those of skill in the art will understand that the transceiver 126 and the remote climate controller 122 may be associated together in a same housing. In fact the transceiver 26 and the remote climate controller 122 may each be embodied on a same printed circuit board or even in a same integrated circuit. The remote climate controller 122 bypasses the security circuit 30 to enable operation of the electrically powered climate control system 132.

The remote climate controller 122 is coupled to the data communications bus 127 extending within the vehicle 121, via the bus interface 115, for communication thereover with the security circuit 130 and optional engine starter 128. The bus interface 115 includes circuitry for interfacing to the proper signal levels and formats on the data communications bus 127 as will be appreciated by those skilled in the art without further discussion herein.

Those skilled in the art will appreciate that there may be intervening components between the bus interface 125 and the data communications bus 127, such as a body control module, engine control module, or powertrain control module. Of course, in some embodiments, the remote climate controller 122 may communicate with the security circuit 130 and/or optional engine starter 128 via a hardwired connection at the hardwire interface 124. In fact, in some embodiments, the vehicle 121 may not have a data bus 127.

The run time period is resettable based upon the remote climate control handheld unit 140 to cause the electrically powered climate control system 132 to run for an additional run time period, or other time period, while the electrically powered climate control system is still running and before shutting off the electrically powered climate control system 132. That is, the transceiver 143 of the remote climate control handheld unit 140 may transmit a signal to the remote climate controller 122 instructing it to reset or extend the run time period. This advantageously allows a user to keep the electrically powered climate control system 132 running for a greater period of time than the run time period without the electrically powered climate control system being stopped.

If the run time period expires before being reset, the remote climate controller 122 stops the electrically powered climate control system 132. To stop the electrically powered climate control system 132, the remote climate controller 122 may cause a climate control stop signal to be generated on the data communications bus 127. It should be understood that the remote climate controller 122 itself may not generate the climate control stop signal on the data communications bus 127, but instead may cause an intervening component to generate the climate control stop signal on the data communications bus.

The vibration unit 145 of the remote climate control handheld unit 140 cooperates with the processor 141 for providing a tactile indication to a user prior to expiration of the run time period. Additionally or alternatively, the speaker 146 may provide an audible indication to the user prior to the expiration of the rune time period. This permits the user to use the remote climate control handheld unit 140 to reset the run time period while the electrically powered climate control system is still running and before shutting off the electrically powered climate control system, for example by entering a command into the input device 148.

The display 147 of the remote climate control handheld unit 140 may cooperate with the processor 141 for providing a visual indication to the user prior to expiration of the run time period. The visual indication may be a countdown until the expiration of the run time period, for example.

The processor 141 of the remote climate control handheld unit 139 includes a timer 49 executing a timing function to operate the vibration unit 145 and the speaker 146. The pattern of vibrations may be settable based upon input received via the input device 148. Of course, the speech message or pattern of tones may also be settable based upon input receives via the input device 148.

As stated above, the remote climate controller 122 selectively operates the electrically powered climate control system 132 responsive to the sensor 134 and the remote climate control handheld unit 140. For example, the remote climate controller 122 may operate the electrically powered climate control system 132 for the run time period if it receives, via the transceiver 126, a signal from the remote climate control handheld unit 140 instructing it to do so.

If, during operation of the electrically powered climate control system 132, the sensor 134 senses that the voltage of the rechargeable battery 135 has fallen below a threshold voltage, the remote climate controller 122 may disable the electrically powered climate control system to conserve the voltage of the rechargeable battery. Similarly, if the remote climate controller 122 receives an instruction to activate the electrically powered climate control system 132, but the sensor 134 senses that the voltage of the rechargeable battery 135 is below a threshold voltage, the remote climate controller 122 may not activate the electrically powered climate control system. This feature helps to prevent excessive discharging of the rechargeable battery 135, due to operation of the electrically powered climate control system 132, that might leave a driver stranded and the vehicle 121 inoperable.

If, during operation of the electrically powered climate control system 132, the sensor 134 senses that the voltage of the rechargeable battery 135 has fallen below a threshold voltage, the remote climate controller 122 may start the engine 129 (if there is one). This may be done to charge the rechargeable battery 135 and to help prevent excessive discharging thereof.

If the remote climate controller 122 receives an instruction to activate the electrically powered climate control system 132, but the sensor 134 senses that the voltage of the rechargeable battery 135 is below a threshold voltage, the remote climate controller 122 may start the engine 129 (if there is one) prior to operating the electrically powered climate control system 132.

In some applications, the remote climate controller 122 may sense if the shift selector of the vehicle 121 is in a position other than park and, if so, the remote climate controller may not start the engine 129. Similarly, the remote climate controller 122 may sense whether the hood of the vehicle 121 is open and may not start the engine 129 based thereupon. In addition, the remote climate controller 122 may shut down the engine 129 if the engine RPM exceeds a predetermined value. Many other vehicle conditions, such as the fuel level of the vehicle 121 (either fossil fuel, or a substance consumed by the rechargeable battery if it is a fuel cell) may be taken into account by the remote climate controller 122 before or during operation of the engine 129 as will be appreciated by those skilled in the art. If the remote climate controller 122 elects to not start, or elects to shut down, the engine 129 due to such a vehicle condition, it may instead deactivate the electrically powered climate control system 132.

The remote climate controller 122 may enable the electrically powered climate control system 132 based upon the sensor 134 sensing the rechargeable battery 135 being coupled to an external power source 137. The external power source 137 may be an electrical socket, a recharging station, or other external power source as known to those skilled in the art.

In some applications, the vehicle 121 may have a solar panel, such as on the roof thereof, coupled to the rechargeable battery 135. The remote climate controller 122 may also enable the electrically powered climate control system 132 based upon the sensor 134 sensing the rechargeable battery 135 being recharged by the solar panel.

Those of skill in the art will appreciate that the sensor 134 may also measure the current flowing in of or out of the rechargeable battery 135 and that the remote climate controller 122 may operate the electrically powered climate control system 132 based thereupon in the same manner as described above with reference to voltages of the rechargeable battery. Similarly, the sensor 134 may measure the temperature of the rechargeable battery 135 and the remote climate controller 122 may also operate the electrically powered climate control system 132 based thereupon in the same manner as described above with reference to the voltage of the rechargeable battery 135.

In some applications, the remote climate controller 122 may operate the window motor 133 while it runs the electrically powered climate control system 132. This may advantageously help cool the passenger compartment of the vehicle 121 more quickly.

Figure 8:
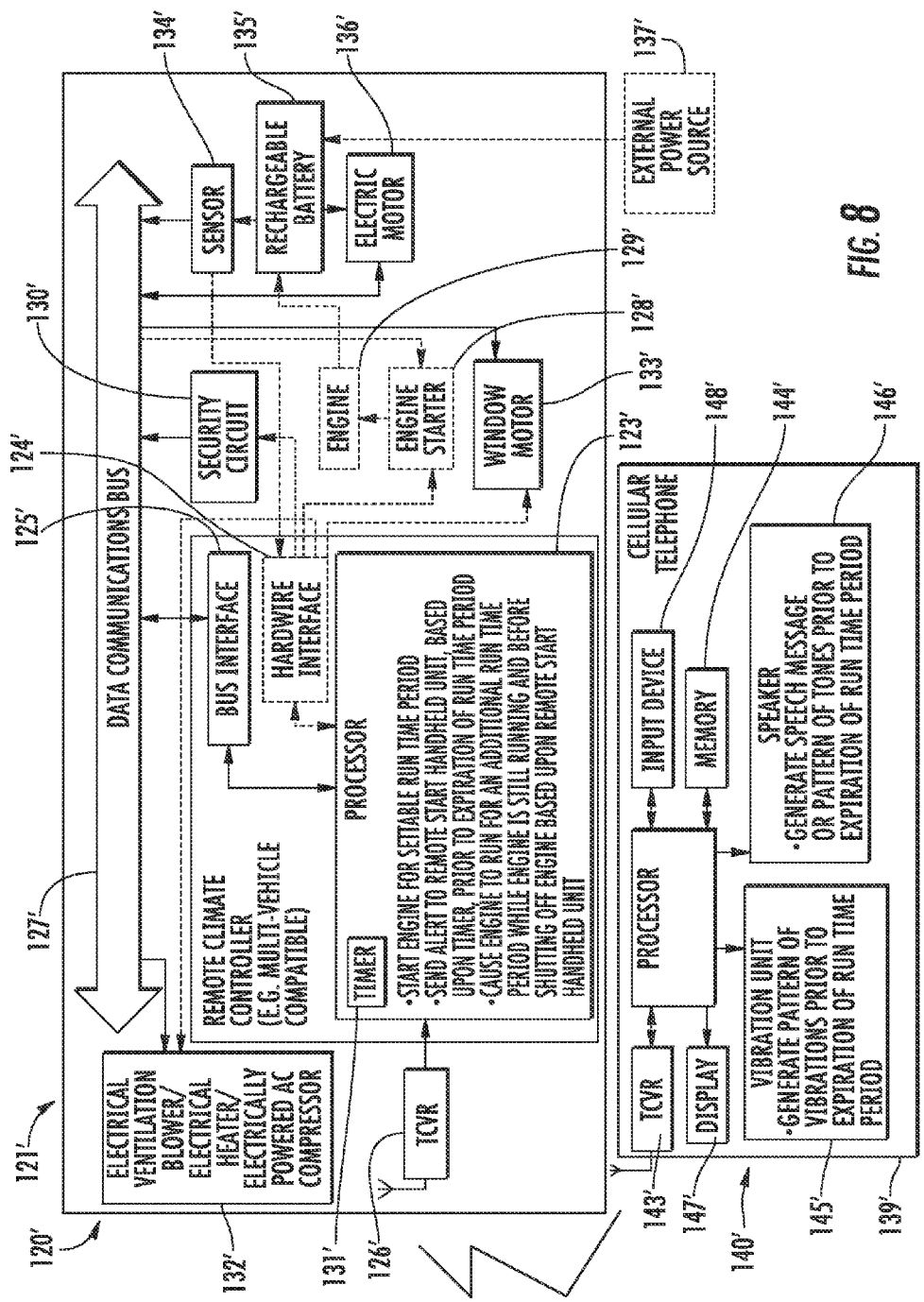
FIG. 8 is a schematic block diagram of a further embodiment of a remote climate control system for a vehicle in accordance with the present invention.

With reference to FIG. 8, an alternative embodiment of the remote climate controller 122' is now described. In this embodiment, the remote climate control handheld unit 140' comprises a cellular telephone. In addition, the run time period is settable, for example based upon the cellular telephone 140'. The run time period may also be settable based upon a switch (not shown) connected to the remote climate controller 122', or based upon a signal received over the data communications bus 127' from another component.

In addition, in this embodiment, the remote climate controller 122' is multi-vehicle compatible. That is, the same remote climate controller 122' may be installed in a variety of vehicles.

In addition, here, remote climate controller 122' implements a timing function executed by a timer 131' of the processor 123' to send an alert to the cellular telephone 122' prior to expiration of the run time period. The processor 141' of the cellular telephone 122' provides the tactile or audible indication based upon the alert. In this embodiment, the tactile indication is a pattern of vibrations, and the audible indication is a speech message or pattern of tones. In some embodiments, the remote climate control handheld unit 140' may include a microphone (not shown) for recording the speech message, and a plurality of songs may be stored in the memory 144', each to be used as a pattern of tones.

Other components of the remote climate control system 120' are similar to those described above with reference to FIG. 7. Those components therefore need no further discussion herein.

Figure 9:
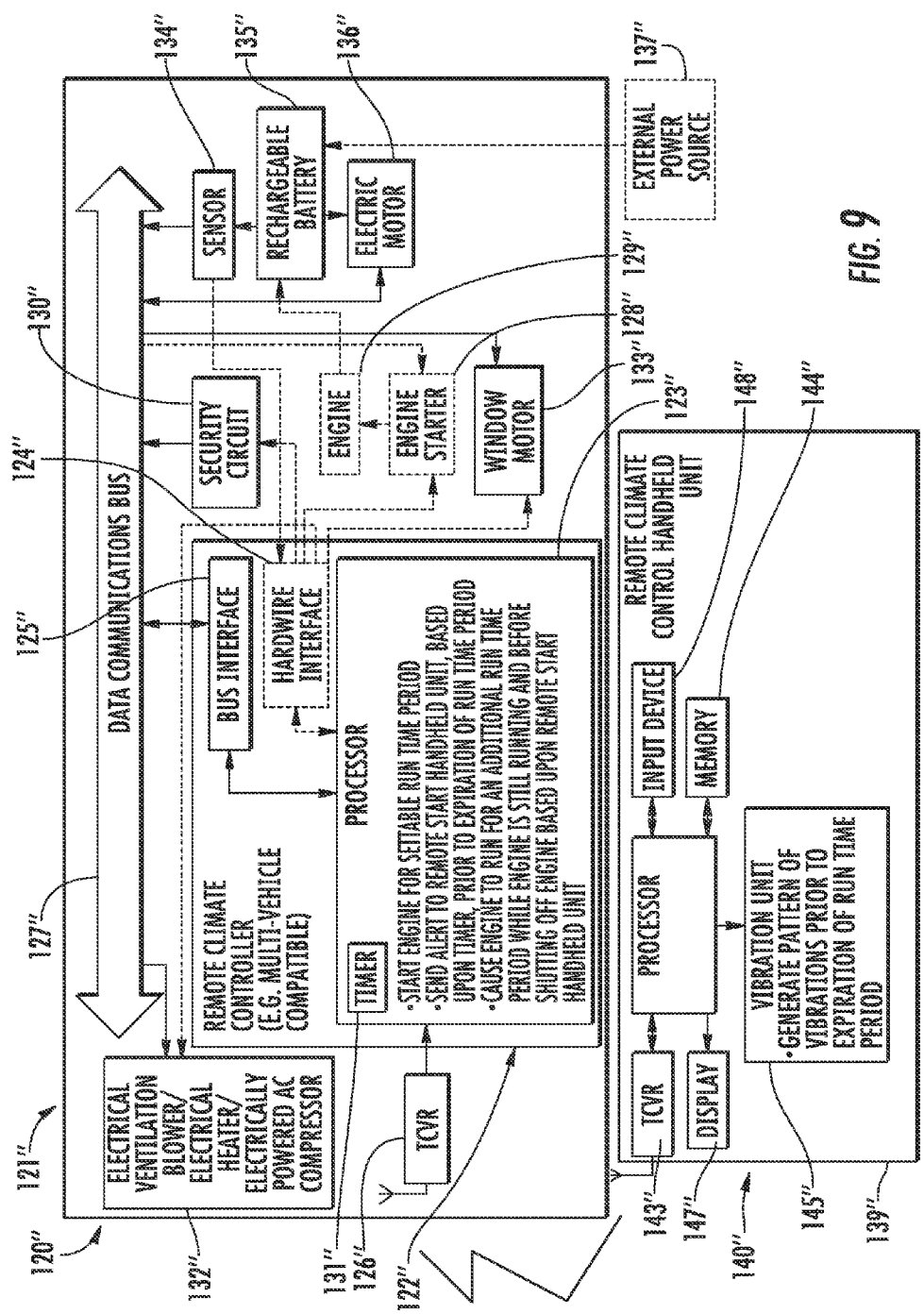
FIG. 9 is a schematic block diagram of yet another embodiment of a remote climate control system for a vehicle in accordance with the present invention.
Figure 10:
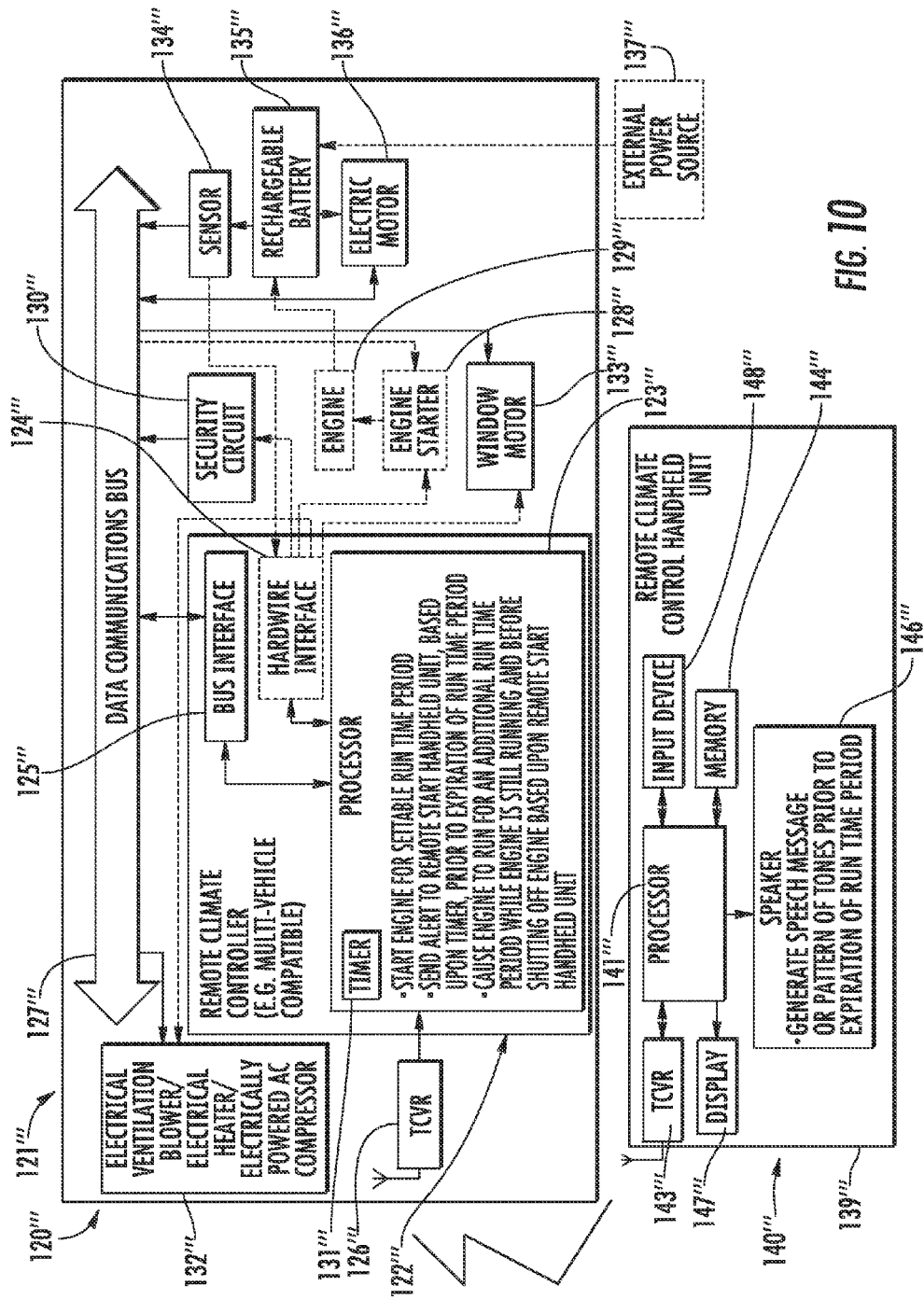
FIG. 10 is a schematic block diagram of a further embodiment of a remote climate control system for a vehicle in accordance with the present invention.

In some embodiments, the remote climate control system 120" (FIG. 9) may provide only a tactile indication through the vibration unit 145", and may not have a speaker. In other embodiments, the remote climate control system 120''' (FIG. 10), many only provide an audible indication through the speaker 146''', and may not have a vibration unit. Other components of the remote climate control systems 120", 120''' are similar to those described above with reference to FIG. 2. Those components therefore need no further discussion herein.

Figure 11:
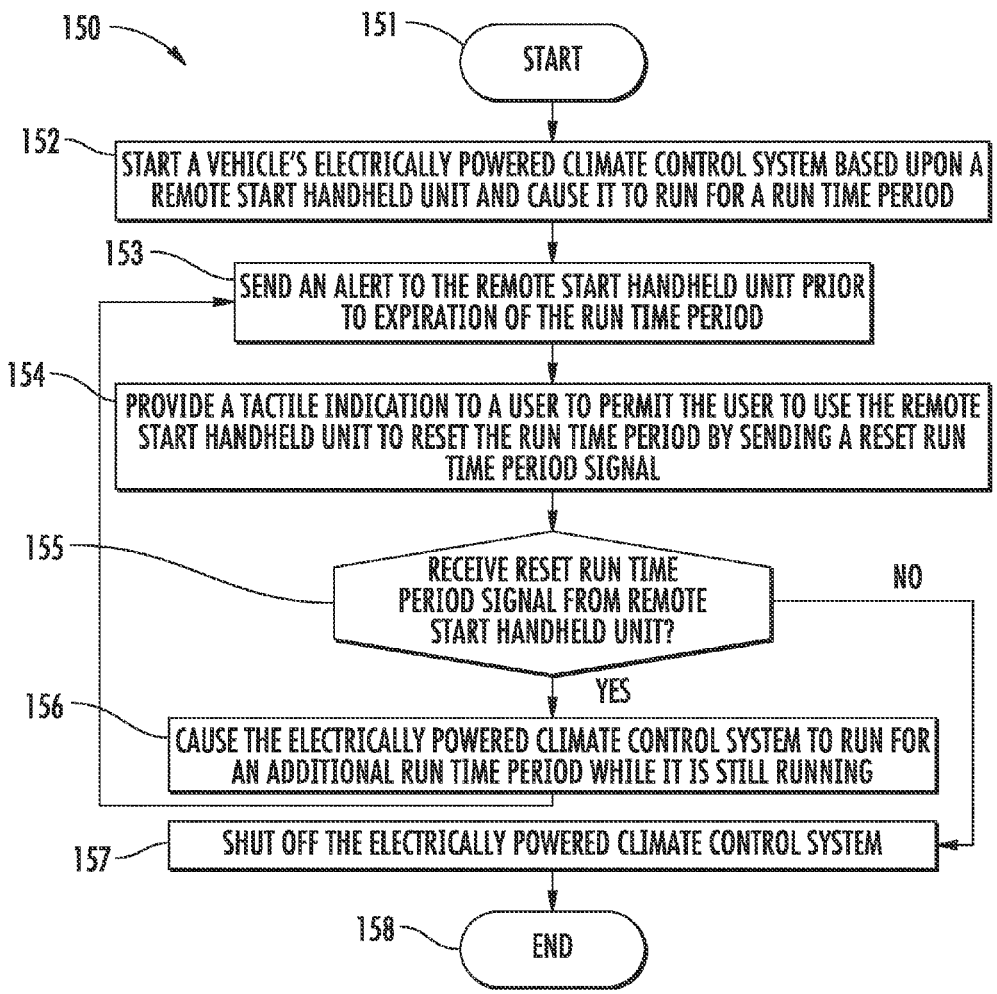
FIG. 11 is a flowchart of a method of operating a remote climate control system in accordance with the present invention.
Figure 12:
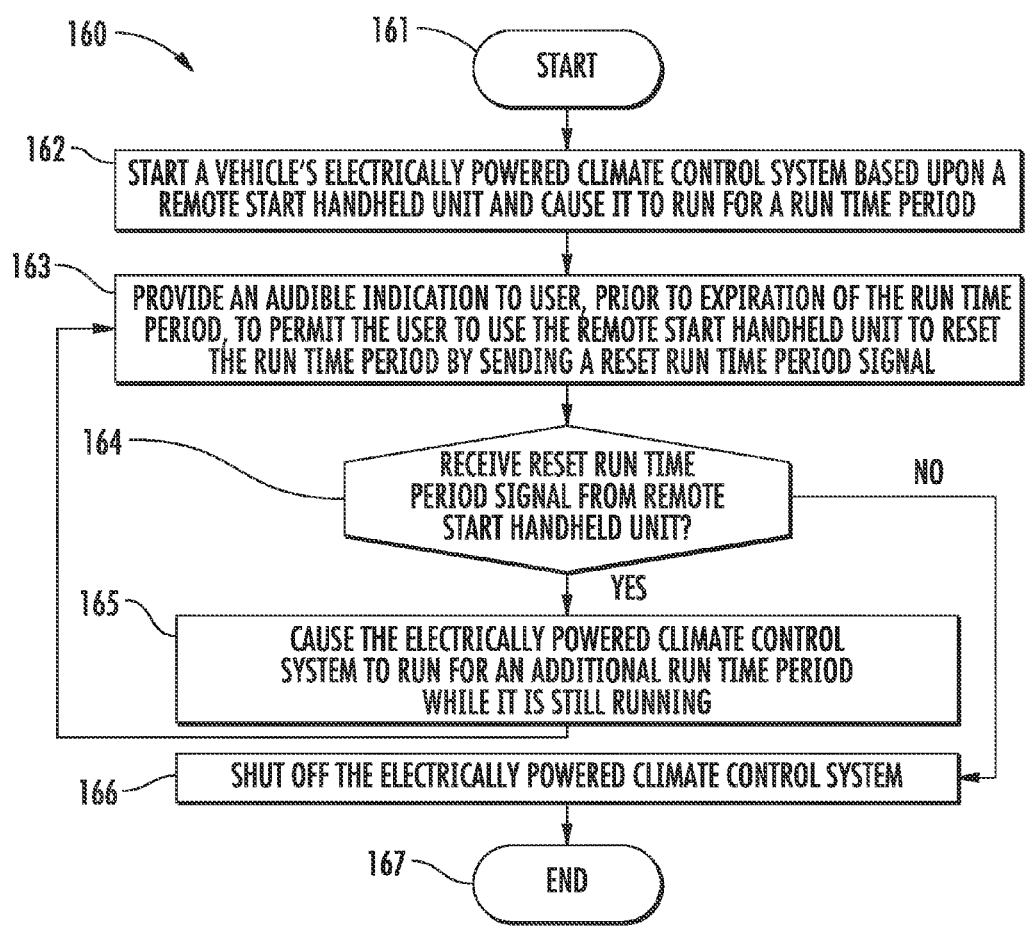
FIG. 12 is a flowchart of another method of operating a remote climate control system in accordance with the present invention.

With reference to the flowchart 150 of FIG. 11, a method of operating a remote climate control system in a vehicle is described. After the start (Block 151), at Block 152, the vehicle's electrically powered climate control system is started based upon a remote climate control handheld unit and caused to run for a run time period.

At Block 153, an alert is sent to the remote climate control handheld unit prior to expiration of the run time period. At Block 154, a tactile indication is provided to a user to permit the user to use the remote climate control handheld unit to reset the run time period by sending a reset run time period signal.

If a reset run time period signal is not received at Block 155, the electrically powered climate control system is shut off at Block 15. If a reset run time period signal is received from the remote climate control handheld unit at Block 155, the electrically powered climate control system is caused to run for an additional run time period at Block 156. At this point, an alert is again sent to the remote climate control handheld unit prior to expiration of the run time period at Block 153 again. The steps repeat until a reset run time period signal is not received from the remote climate control handheld unit at Block 155. At this point, the electrically powered climate control system is shut off at Block 157. Block 158 indicates the end of the method.

With reference to the flowchart 160 of FIG. 6, another method of operating a remote climate control system is now described. After the start (Block 161), at Block 162, the vehicle's electrically powered climate control system is started based upon a remote climate control handheld unit and caused to run for a run time period.

At Block 163, an audible indication is provided to a user, prior to expiration of the rune time period, to permit the user to use the remote climate control handheld unit to reset the run time period by sending a reset run time period signal.

If a reset run time period signal is not received at Block 164, the electrically powered climate control system is shut off at Block 166. If a reset run time period signal is received from the remote climate control handheld unit at Block 164, the electrically powered climate control system is caused to run for an additional run time period at Block 165. At this point, an audible indication is again provided to the user at Block 163. The steps repeat until a reset run time period signal is not received from the remote climate control handheld unit at Block 164. At this point, the electrically powered climate control system is shut off at Block 166. Block 167 indicates the end of the method.

Other details of such remote starting systems 20 may be found in co-pending applications REMOTE VEHICLE STARTING SYSTEM PROVIDING A TACTILE INDICATION RELATING TO REMOTE STARTING AND ASSOCIATED METHODS, Ser. No. 12/571,089 filed Sep. 30, 2009, and REMOTE VEHICLE STARTING SYSTEM PROVIDING AN AUDIBLE INDICATION RELATING TO REMOTE STARTING AND ASSOCIATED METHODS, Ser. No. 12/570,994 filed Sep. 30, 2009, the entire disclosures of which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A remote climate control system for a vehicle comprising an electrical power source and an electrically powered climate control system selectively powered thereby, the remote climate control system comprising:
   a remote climate control handheld unit comprising a housing and a processor carried thereby; and
   a remote climate controller to be positioned at the vehicle for starting the electrically powered climate control system based upon the remote climate control handheld unit and causing the electrically powered climate control system to run for a run time period before shutting off the electrically powered climate control system;
   said remote climate controller also being resettable based upon the remote climate control handheld unit to cause the electrically powered climate control system to run for an additional run time period while the electrically powered climate control system is still running and before shutting off the electrically powered climate control system;
   said remote climate control handheld unit further comprising an indicator cooperating with said processor for providing an indication to a user prior to expiration of the run time period to permit a user to use said remote climate control handheld unit to reset the run time period while the electrically powered climate control system is still running and before shutting off the electrically powered climate control system.

2. The remote climate control system of claim 1, wherein the indicator comprises a tactile indicator and the indication comprises a tactile indication.

3. The remote climate control system of claim 1, wherein the indicator comprises an audible indicator and the indication comprises an audible indication.

4. The remote climate control system of claim 1, wherein the indicator comprises a visible indicator and the indication comprises a visible indication.

5. The remote climate control system of claim 1, wherein said processor implements a timing function to operate said indicator.

6. The remote climate control system of claim 1, wherein said remote climate controller implements a timing function to send an alert to said remote climate control handheld unit prior to expiration of the run time period; and wherein said processor of said remote climate control handheld unit provides the indication based upon the alert.

7. The remote climate control system of claim 1, wherein said remote climate controller has a settable run time period.

8. The remote climate control system of claim 1, wherein the vehicle further comprises a data communications bus extending throughout the vehicle; and wherein said remote climate controller causes a climate control start signal to be generated on the data communications bus for starting the electrically powered climate control system.

9. The remote climate control system of claim 8, wherein said remote climate controller causes a climate control stop signal to be generated on the data communications bus for shutting off the electrically powered climate control system.

10. The remote climate control system of claim 1, wherein the electrically powered system comprises at least one of an electrically powered air conditioning (AC) compressor, an electrical heater, and an electrical ventilation blower.

11. The remote climate control system of claim 1, wherein the vehicle further comprises a sensor associated with the electrical power source; and wherein said remote climate controller is also for starting the electrically powered climate control system based upon the sensor.

12. The remote climate control system of claim 1, wherein said remote climate control handheld unit comprises a cellular telephone.

13. The remote climate control system of claim 1, wherein said remote climate controller comprises a multi-vehicle compatible remote climate controller.

14. A remote climate control system for a vehicle comprising an electrical power source, an electrically powered climate control system selectively powered thereby, and a data communications bus extending throughout the vehicle, the remote climate control system comprising:
   a remote climate control handheld unit comprising a housing and a processor carried thereby;
   a remote climate controller to be positioned at the vehicle for causing a climate control start signal to be generated on the data communications bus for starting the electrically powered climate control system based upon the remote climate control handheld unit and causing the electrically powered climate control system to run for a settable run time period before shutting off the electrically powered climate control system;

said remote climate controller also being resettable based upon the remote climate control handheld unit to cause the electrically powered climate control system to run for an additional settable run time period while the electrically powered climate control system is still running and before shutting off the electrically powered climate control system;

said remote climate control handheld unit further comprising an indicator cooperating with said processor for providing an indication to a user prior to expiration of the settable run time period to permit a user to use said remote climate control handheld unit to reset the run time period while the electrically powered climate control system is still running and before shutting off the electrically powered climate control system.

15. The remote climate control system of claim 14, wherein the indicator comprises a tactile indicator and the indication comprises a tactile indication.

16. The remote climate control system of claim 14, wherein the indicator comprises an audible indicator and the indication comprises an audible indication.

17. The remote climate control system of claim 14, wherein the indicator comprises a visible indicator and the indication comprises a visible indication.

18. The remote climate control system of claim 14, wherein said processor implements a timing function to operate said indicator.

19. The remote climate control system of claim 14, wherein said remote climate controller implements a timing function to send an alert to said remote climate control handheld unit prior to expiration of the run time period; and wherein said processor of said remote climate control handheld unit provides the indication based upon the alert.

20. A method of using a remote climate control system for a vehicle comprising an electrical power source and an electrically powered climate control system selectively powered thereby, the method comprising:

starting the electrically powered climate control system, with a remote climate controller positioned at the vehicle, based upon a remote climate control handheld unit and the electrically powered climate control system, and causing the electrically powered climate control system to run for a run time period before shutting off the electrically powered climate control system; and generating an indication, using an indicator, to a user prior to expiration of the run time period to permit a user to use the remote climate control handheld unit to reset the run time period to cause the electrically powered climate control system to run for an additional run time period, while the electrically powered climate control system is still running and before shutting off the electrically powered climate control system.

21. The method of claim 20, wherein the indicator comprises a tactile indicator and the indication comprises a tactile indication.

22. The method of claim 20, wherein the indicator comprises an audible indicator and the indication comprises an audible indication.

23. The method of claim 20, wherein the indicator comprises a visible indicator and the indication comprises a visible indication.

24. The method of claim 20, wherein the vehicle further comprises a data communications bus extending throughout the vehicle; and wherein the electrically powered climate control system is started by causing a climate control start signal to be generated on the data communications bus with the remote climate controller.

25. The method of claim 24, wherein the electrically powered climate control system is shut off by causing a climate control stop signal to be generated on the data communications bus with the remote climate controller.

* * * * *